Nov. 1, 1932.  P. SCHULTES  1,886,308
SPRING SEAT WITH LATHS COVERING
Filed Aug. 21, 1929  2 Sheets-Sheet 1
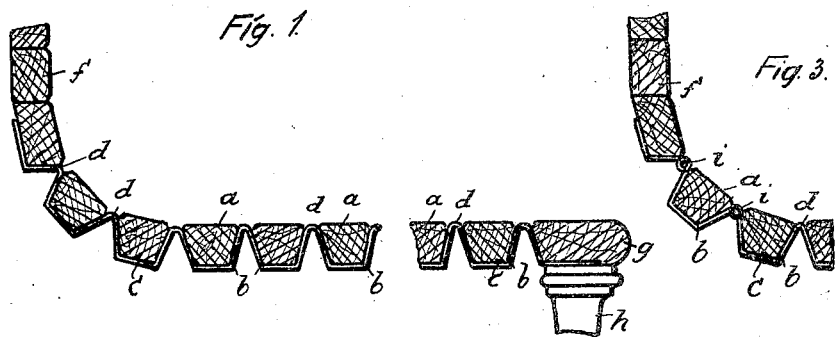
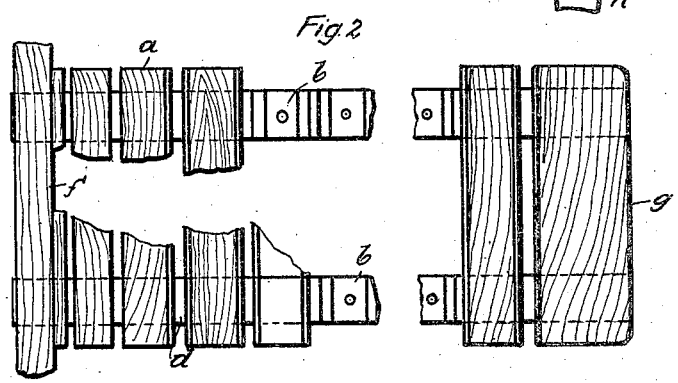
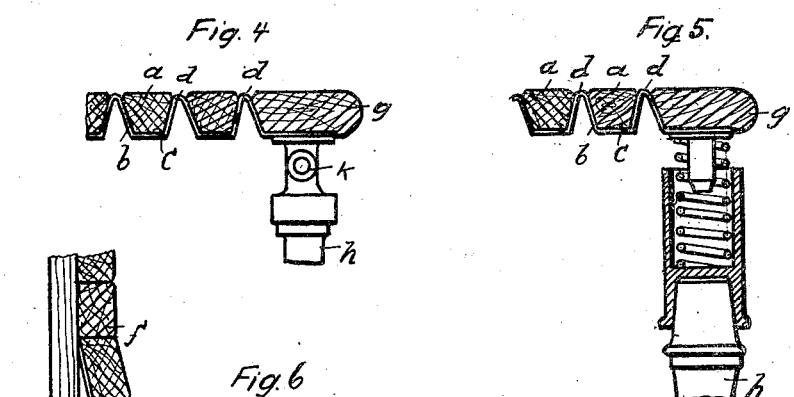
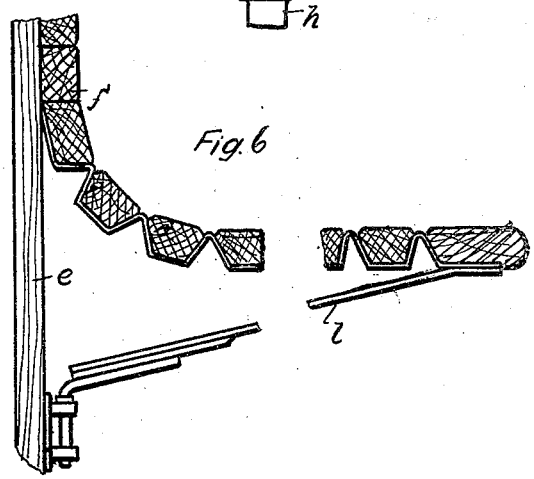
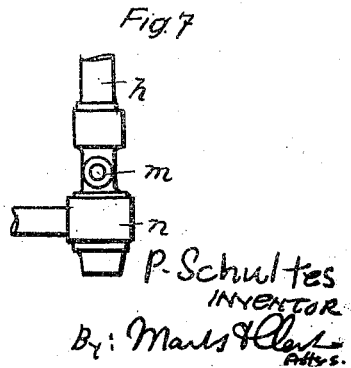
P. Schultes
INVENTOR
By: Marks & Clerk
Attys.

Nov. 1, 1932.  P. SCHULTES  1,886,308
SPRING SEAT WITH LATHS COVERING
Filed Aug. 21, 1929  2 Sheets-Sheet 2
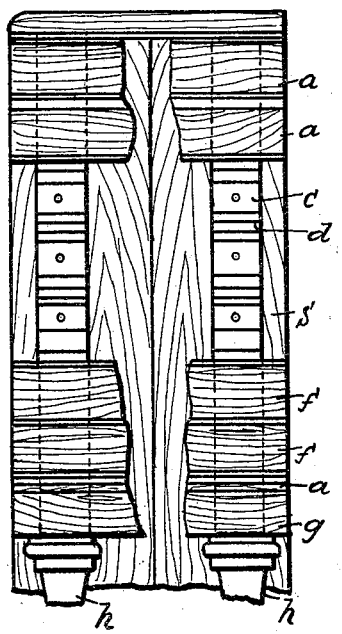
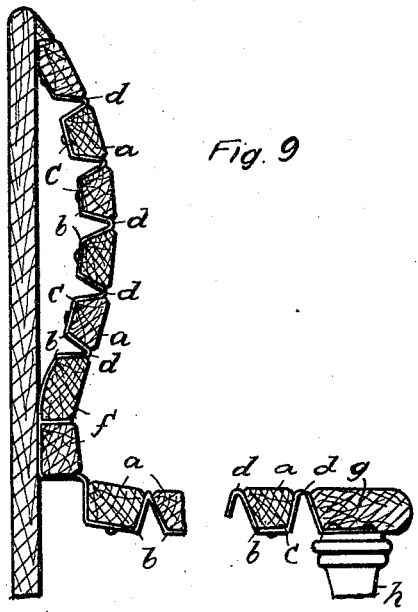
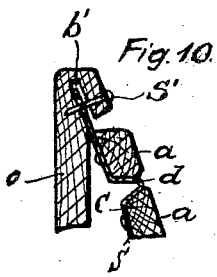
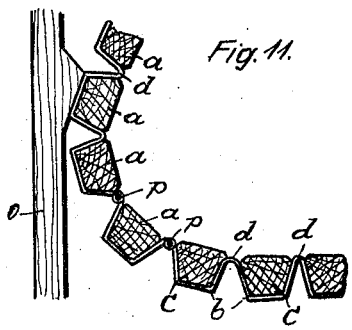
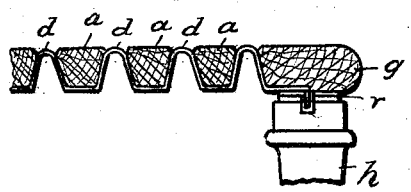
P. Schultes
INVENTOR Patented Nov. 1, 1932

1,886,308

UNITED STATES PATENT OFFICE

PAUL SCHULTES, OF LEICHLINGEN, GERMANY

SPRING SEAT WITH LATHS COVERING

Application filed August 21, 1929, Serial No. 387,517, and in Germany August 24, 1928.

This invention relates to a spring seat comprising a covering of transverse laths of substantially rigid material, such as wood or similar material, the laths being firmly secured to cross carrying members.

According to the invention the carrying members comprise steel bends bent to form aligned trough-shaped grooves, serving to receive the laths, bends between the latter rendering the seat springy.

The trough-shaped grooves are completely filled by said laths, so that the springing of the seat is effected by flexion of the upper bends of the steel bends only.

Several examples embodying the invention are illustrated in the accompanying drawings.

Figure 1 is a section of a first example.

Figure 2 is a plan of Figure 1 part of the laths being removed.

Figures 3 to 7 show alternative details according to the invention.

Figure 8 is a front view of a further example of the invention, partly covered by laths.

Figure 9 is a cross section of Figure 8.

Figure 10 shows the upper end of a spring carrier for the back of a bench moving in a slot in the uppermost lath.

Figure 11 shows a connection of the spring carriers for seat and back, formed by hinges, and Figure 12 is an adjustable and demountable bearing for the front ends of the spring carrier for the seat.

The example illustrated in Figures 1 and 2 show steel bands $b$ with their rear ends bent upward and screwed to the seat back $f$ while the front ends are fixed to the front lath $g$ of the seat, which can slide in a groove in the front support $h$ of the seat. The bands $b$ are bent to form troughs which are completely filled by the laths $a$ flexion only taking place at the intermediate bends $d$.

In a further example of the invention (Figure 3) instead of bends $d$ one or more hinges $i$ are provided at the rear end which ensure better adaptation of the springy seat to the shape of the body, while the seat is rendered collapsible.

The front lath of the seat can also be connected by hinges $k$ to the front supports $h$ of the seat, as shown by Figure 4, so as to render the supports and the seat foldable together.

To make the seat still more springy as shown in Figure 5 a spring may be provided in the front support $h$ of the seat, or else (see Figure 6) a projecting cantilever spring $l$ can be arranged below the seat and fixed to the rear support $e$ of the seat, or hinged to the latter so that it can be turned aside.

Another way of obtaining additional resilience of the seat, is to attach the front support $h$ (see Figure 7) to the floor or the lower frame $n$ by means of hinges $m$.

It has been found that a still better effect of the spring carriers is achieved if the latter together with the front lath of the seat are not movably attached to the front supports, but are fixed immovably to the said latter. Further, it has been found desirable to render the back springy in a like manner as described for the seat; here it is of advantage to shape the spring carriers of the back to the curve of the human back. It is immaterial to the invention whether the spring carriers for the back and the spring carriers of the seat are made in one piece going right through, or whether they are connected by means of hinges, or whether each carrier is fixed separately to the rear support of the seat and the back frame respectively. At their upper ends the spring carriers of the back may be fixed or held in sliding bearings to the back frame.

The example shown in Figures 8 and 9 has the spring carriers $s$ for the back fixedly screwed at the upper and lower ends to the back frame $o$. The spring carriers $b$ for the seat are in the same manner screwed fixedly at the rear to the back frame $o$ and in front to the front support $h$ of the seat.

The spring carriers $b$ and $s$ may also be made in one piece, the upper and front ends being suitably screwed to the seat frame.

When the lower ends of the spring carriers $s$ for the back are fixed to the back frame, the upper ends of the steel bands $a$ may be held in sliding bearings, as shown by Figure 10. In reducing this feature to practice the upper end of the back frame $o$ is notched or grooved as shown at $b'$ while the upper ends of the carriers are slotted and these slotted portions are engaged by fasteners $s'$ anchored in the frame $o$ and traversing the grooves $b'$.

The spring carriers $b$ and $s$ may also be interconnected by means of hinges $m$, as depicted in Figure 11.

As will be seen from Figure 12 the spring carriers $b$ may also interlock with the front support $h$ of the seat by means of a bent over projection $r$ or a like device, to prevent dislocation from the latter. Hinges $p$ (Figure 11) may be provided between the spring carriers $b$ and $s$, to enable the seat to be folded up.

What I claim is:

1. A spring seat comprising transverse laths forming the seat and back surface and supporting carriers arranged at the sides of the seat composed of parts bent to form trough-shaped grooves arranged one behind the other and serving to receive the ends of laths, and intermediate connecting parts between the trough-shaped parts for exerting a spring action.

2. A spring seat including transversely disposed laths forming the seat and back surfaces, supporting carriers arranged at the sides of the seat and including inwardly bent parts forming trough-shaped grooves disposed one behind the other for receiving the ends of the laths, parts intermediate and connected with the bent parts for exerting a spring action, and means for movably mounting one of the ends of said supporting carriers for assisting the spring action of the seat.

3. A seat according to claim 2, wherein a front support is provided for the supporting carriers, and spring inserts in said support to increase the resilient action of the seat.

4. A seat according to claim 2, wherein the means for movably supporting the front ends of the carriers consists of a rear support, and plate springs projecting forwardly from the rear support to resiliently support the front ends of the said carriers.

5. A seat according to claim 2, wherein the means for movably mounting the carriers includes a front support terminating at its upper end in a slot, and means on the front ends of the carriers engaging in the slot for enabling a slight longitudinal displacement of the carriers.

6. A seat according to claim 2, wherein the means for movably mounting one of the ends of said supporting carriers includes a slotted support, and means on the adjacent ends of the carriers and engaging in the slots for enabling a slight longitudinal displacement of the carriers.

In testimony whereof I affix my signature.

PAUL SCHULTES.